United States Patent
Hassan et al.

(10) Patent No.: US 9,766,400 B2
(45) Date of Patent: Sep. 19, 2017

(54) METHOD FOR ADJUSTING PROPERTIES OF A PHOTONIC CIRCUIT BY POST FABRICATION ION IMPLANTATION, AND ADJUSTED WAVEGUIDE AND PHOTONIC CIRCUIT

(71) Applicant: Commissariat a l'energie atomique et aux energies alternatives, Paris (FR)

(72) Inventors: Karim Hassan, Voiron (FR); Corrado Sciancalepore, Grenoble (FR); Badhise Ben Bakir, Brezins (FR); Sylvie Menezo, Voiron (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 15/090,977

(22) Filed: Apr. 5, 2016

(65) Prior Publication Data
US 2016/0299292 A1    Oct. 13, 2016

(30) Foreign Application Priority Data
Apr. 8, 2015   (FR) ...................................... 15 53024

(51) Int. Cl.
*G02B 6/134*   (2006.01)
*G02B 6/12*    (2006.01)
(Continued)

(52) U.S. Cl.
CPC ......... *G02B 6/1347* (2013.01); *G02B 6/1228* (2013.01); *G02B 6/136* (2013.01);
(Continued)

(58) Field of Classification Search
CPC .................... G02B 6/1347; G02B 2006/12097
See application file for complete search history.

(56) References Cited

U.S. PATENT DOCUMENTS

| | | | |
|---|---|---|---|
| 4,938,836 A | 7/1990 | Carenco et al. | |
| 6,221,565 B1 * | 4/2001 | Jain | G02B 6/29322 216/24 |

(Continued)

FOREIGN PATENT DOCUMENTS

| | | |
|---|---|---|
| EP | 0 285 499 A1 | 10/1988 |
| EP | 1 074 865 A2 | 2/2001 |
| WO | WO 2013/119981 A1 | 8/2013 |

OTHER PUBLICATIONS

U.S. Appl. No. 14/884,126, filed Oct. 10, 2015, Karim Hassan, et al.
(Continued)

*Primary Examiner* — Omar R Rojas
(74) *Attorney, Agent, or Firm* — Oblon, McClelland, Maier & Neustadt, L.L.P.

(57) ABSTRACT

A method for adjusting the properties of a photonic circuit such that they fit with expected properties, the photonic circuit including a waveguide which includes a light propagation region, is provided. The method includes a step of modifying the refractive index of at least one zone of the region, the step being implemented by an ion implantation in the at least one zone. It extends to a waveguide the light propagation region of which has at least one zone with a refractive index modified by ion implantation in which the light remains confined, as well as a photonic circuit incorporating such a guide.

13 Claims, 5 Drawing Sheets

(51) Int. Cl.
*G02B 6/122* (2006.01)
*G02B 6/136* (2006.01)
*G02F 1/225* (2006.01)
*G02F 1/21* (2006.01)

(52) U.S. Cl.
CPC ........ *G02F 1/2257* (2013.01); *G02B 6/12011* (2013.01); *G02B 2006/12035* (2013.01); *G02B 2006/12097* (2013.01); *G02B 2006/12159* (2013.01); *G02F 2001/212* (2013.01)

(56) References Cited

U.S. PATENT DOCUMENTS

| | | |
|---|---|---|
| 6,393,185 B1 * | 5/2002 | Deacon .............. G02B 6/12004 385/12 |
| 6,516,117 B1 | 2/2003 | Fujimaki et al. |
| 7,881,571 B2 | 2/2011 | Ben Bakir et al. |
| 8,285,102 B2 | 10/2012 | Ben Bakir et al. |
| 2002/0150337 A1 | 10/2002 | Fujimaki |
| 2003/0118271 A1 | 6/2003 | Fujimaki |
| 2013/0243383 A1 | 9/2013 | Agarwal et al. |

OTHER PUBLICATIONS

U.S. Appl. No. 14/960,876, filed Dec. 7, 2015, Sylvie Menezo, et al.
French Preliminary Search Report issued Mar. 16, 2016 in French Application 15 53024 filed on Apr. 8, 2015 (with English Translation of Categories of Cited Documents).

* cited by examiner

METHOD FOR ADJUSTING PROPERTIES OF A PHOTONIC CIRCUIT BY POST FABRICATION ION IMPLANTATION, AND ADJUSTED WAVEGUIDE AND PHOTONIC CIRCUIT

TECHNICAL FIELD

The field of the invention is that of photonics and opto-electronics on micro-nano-structured silicon. The invention generally relates to waveguides for photonic circuits and more particularly relates to a technique enabling manufacturing uncertainties of such circuits to be overcome.

STATE OF PRIOR ART

Different photonic components, being active and passive, form a full library of components which enable all the function required for processing information by on-chip light to be made, from transmission to reception, passing through low loss transmission, wavelength multiplexing, and high frequency handling of signals. In this library, there are lasers, RF components (modulators, photodiodes), passive components (guides, (de)multiplexers, resonating filters, couplers), and (de)coupling networks.

However, most of these components suffer from a weakness from the centre material common to all these components, namely silicon, the refractive index of which is naturally sensitive to temperature variations. This intrinsic sensitivity requires to pay special attention during design since it generates phase errors in circuits, resulting in a drastic decrease in performance, or even a dysfunction of one or more circuit parts.

This sensitivity deleterious at first can be judiciously controlled by heating elements or electrical contacts placed in proximity to the components. In particular, a fine and dynamic management enables spatio-frequential adjustments essential to overcome manufacture uncertainties to be made and thus optical signals to fit with the international standards (telecom/datacom). These heaters/electrodes are positioned in "Back-End Of Line" (BEOL), i.e. at the end of the manufacturing process, for managing thermal problems and for spatio-frequential adjustments between transmission and reception blocks, including the multiplexing of optical carriers.

This active heat control is however made at the expense of a high energy consumption and possibly further optical losses.

In order to overcome drawbacks of such an energy intensive active control, it has been proposed in international application WO 2013/119981 A1 to add a further material at the interface between the waveguide and its encapsulation layer in order to have a post-manufacture adjustment parameter. A UV exposure of this new interface material indeed comes to modify the refractive index within the guide, thus enabling spectral properties of a photonic circuit integrating such a guide to be readjusted.

However, this solution comes to complicate the manufacturing of the photonic circuits since the integration of this interface material to the circuit has to be made during the manufacturing thereof.

DISCLOSURE OF THE INVENTION

One object of the invention is to provide a technique enabling, after manufacturing and on an industrial scale, spectral properties of photonic components on silicon to be readjusted, without adding material at the guide/encapsulation interface, but simply by implementing BEOL post-manufacture steps readily integratable in a production line.

To that end, it provides a method for adjusting the properties of a photonic circuit such that they fit with expected properties, the photonic circuit including a waveguide which comprises a light propagation region. The method includes a step of modifying the refractive index of at least one zone of said region, said step being implemented by means of an ion implantation in the at least one zone. It further comprises, before the step of modifying the refractive index of the at least one zone, a step of removing an encapsulation of the at least one zone made of a material different from the material of an encapsulation layer covering said region except at the at least one zone, and, after the step of modifying the refractive index of the at least one zone, a step of encapsulating the at least one zone with said material different from the material of the encapsulation layer.

Some preferred but in no way limiting aspects of this method are the following ones:
  it comprises, before the step of modifying the refractive index of the at least one zone, a step of detecting spectral properties of the photonic circuit and a step of determining implantation conditions as a function of the deviation of the detected spectral properties relative to the expected spectral properties.
  it comprises, following the step of encapsulating the at least one zone, depositing a metal electrode on the encapsulation of the at least one zone.

The invention also extends to a waveguide for a photonic circuit, comprising a light propagation region which has at least one zone having a refractive index modified by ion implantation wherein the light remains confined. The waveguide comprises an encapsulation layer, for example of a material having a negative thermo-optic coefficient such as $TiO_2$, covering the light propagation region except at the at least one zone, an encapsulation of the at least one zone being made of a material different from the material of the encapsulation layer, for example of $SiO_2$.

Some preferred but in no way limiting aspects of this waveguide are the following ones:
  the ion species implanted in the at least one region are group IV ionic species, such as germanium ions;
  the at least one zone extends in the light propagation direction over a length higher than half the light wavelength;
  the light propagation region is of the rib or strip type and the at least one zone is an upper portion of the rib or of the strip which extends over a determined distance in the light propagation direction;
  the at least one zone has, in the light propagation direction, an inlet transition section the size of which gradually increases, a centre section with a constant size, and an outlet transition section the size of which gradually decreases;
  it further comprises a metal electrode arranged on the encapsulation of the at least one zone.

The invention also extends to a photonic circuit integrating such a waveguide.

BRIEF DESCRIPTION OF THE DRAWINGS

Further aspects, purposes, advantages and characteristics of the invention will better appear upon reading the following detailed description of preferred embodiments thereof, given by way of non-limiting example and made in reference to the appended drawings on which.

DETAILED DISCLOSURE OF PARTICULAR EMBODIMENTS

The invention aims at overcoming drifts/uncertainties about manufacturing a photonic circuit such that this has, or at least is close to, the anticipated spectral characteristics (for example because these are standardised characteristics).

Generally, it enables the spectral characteristics of a photonic circuit to be controllably readjusted post-manufacture by performing one or more ion implantations located in zones of interest of the circuit.

Such an implantation generates an increase in the refractive index of the implanted material. This variation in the refractive index can thus be controlled so as to make a phase adjustment in the photonic circuit. This adjustment is passively achieved by modifying the properties of the constituent materials of the circuit.

The invention more precisely deals with a method for adjusting the properties of a photonic circuit such that they fit with expected properties. The photonic circuit includes a waveguide which comprises a region, generally called a core, for propagating light, wherein light is strongly confined. The method includes a step of modifying the refractive index of at least one zone of said region in which the light remains confined, said step being implemented by means of an ion implantation in the at least one zone.

The ionic species implanted in the at least one zone of the light propagation region can be group IV ionic species, such as carbon, germanium, tin or lead ions, or even noble gas ionic species, such as neon, argon, krypton or xenon ions.

This post-manufacture adjustment method can be implemented on the entire photonic circuitry, regardless of the component shape or the type of guides which make it up. The waveguide can also be of the rib type, strip type or even slab type.

The invention also extends to a waveguide for a photonic circuit, comprising a light propagation region, characterised in that said region has at least one zone with a refractive index modified by ion implantation in which the light remains confined. The implanted zone thus enables properties of the circuit to be readjusted. The invention is also concerned with the circuit having the properties thus adjusted.

The post-manufacture adjustment method typically starts with, before the step of modifying the refractive index of the at least one zone, a step of detecting spectral properties of the photonic circuit and a step of determining implantation conditions as a function of the deviation of the detected spectral properties relative to the expected spectral properties.

The detection of the spectral properties of the photonic circuit is made for example by means of a fibre-to-fibre measurement of the transmission spectrum of the photonic circuit. And by implantation conditions, it is meant a definition of "where?" and "how?" to implant, that is a mapping of the implanted zone(s) (location and geometry: length in the light propagation direction and width in the direction transverse to the light propagation direction), and a setting of the implantation parameters, that is dose and energy.

Figure 1:
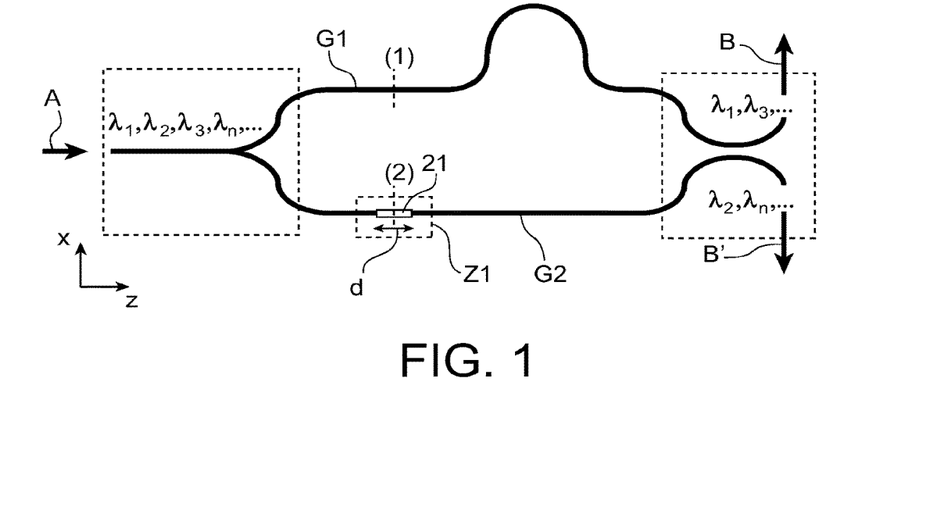
FIG. 1 is a scheme of a Mach-Zehnder interferometer comprising a waveguide according to the first aspect of the invention.

By way of illustrative example of the invention, in FIG. 1 is represented a scheme of a Mach-Zehnder interferometer that can be used in cascade with other interferometers as a (de)multiplexer and the properties of which have been adjusted post-manufacture by the implementation of the method according to the invention.

In this FIG. 1, arrow A represents the multiplexed optical flux provided on the input port of the interferometer, and arrows B and B' represent the different wavelengths separated by the interferometer and available on these output ports. The interferometer has two arms phase-shifted with respect to each other having the form of a first and a second waveguide G1, G2 having different lengths.

Figure 2A:
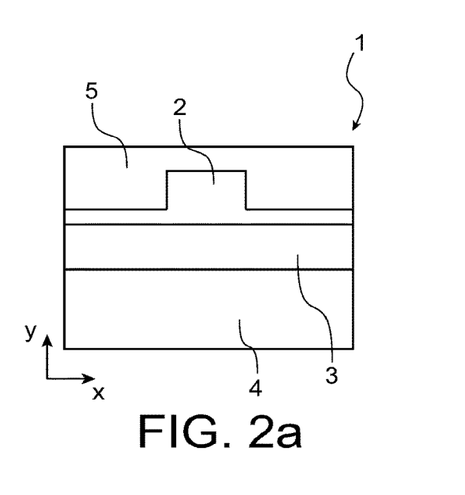
FIGS. 2a and 2b are cross-section views of waveguides of each of the arms of the interferometer of FIG. 1, the waveguide of FIG. 2b being in accordance with the invention.
Figure 2B:
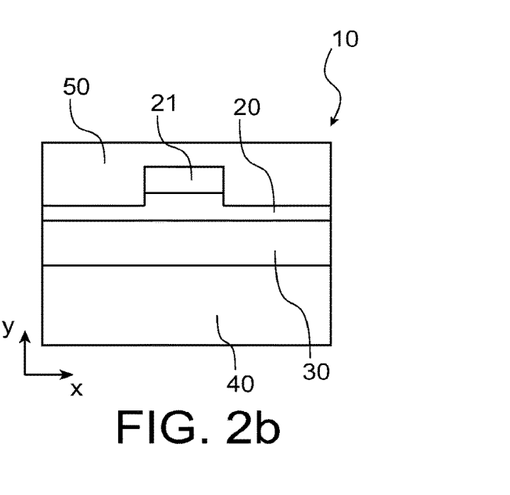

FIGS. 2a and 2b represent cross-section views respectively, transverse to the light propagation direction, of the first and second waveguides G1, G2 at zones of these guides identified by references (1) and (2) in FIG. 2.

The waveguide 1 of FIG. 2a is a conventional waveguide with a refractive index not modified by post-manufacture operations. It comprises a light propagation region 2 of silicon (here of the rib type) formed by etching the superficial layer of a silicon-on-insulator substrate. The region 2 thus bears against a buried oxide layer 3 interposed between the region 2 and a silicon substrate 4. An encapsulation layer 5 covers the region 2.

The waveguide 10 of FIG. 2b is in accordance with the invention in that it has undergone a localised ion implantation in its light propagation region 20 in order to modify its refractive index in a zone 21. This localised modification in the refractive index does not affect the light guide function, the light remaining actually confined in the waveguide, including in the implanted zone, for operating wavelengths of the photonic circuit.

The light propagation region 20 also bears against a buried oxide layer 30 interposed between the region 20 and a silicon substrate 40, an encapsulation layer 50 covering the region 20. As represented in FIG. 2b, the implanted zone 21 can be an upper portion of the region 20. The thickness of the implanted zone is then lower than or equal to the total height of the region 20. On the other hand, as represented in FIG. 1, the implanted region extends over a determined distance (length) d in the light propagation direction. This distance is typically higher than half the light wavelength, and lower than a few tens of micrometers.

When the waveguide is of the strip type, the width of the implanted zone 21 typically corresponds to the strip width. When the waveguide is of the rib type, the width of the implanted zone can match or not with the rib width. In particular, as will be described more in detail in the following, the width of the implanted zone can be higher than the rib width, at least in a part of the implanted zone.

Figure 3:
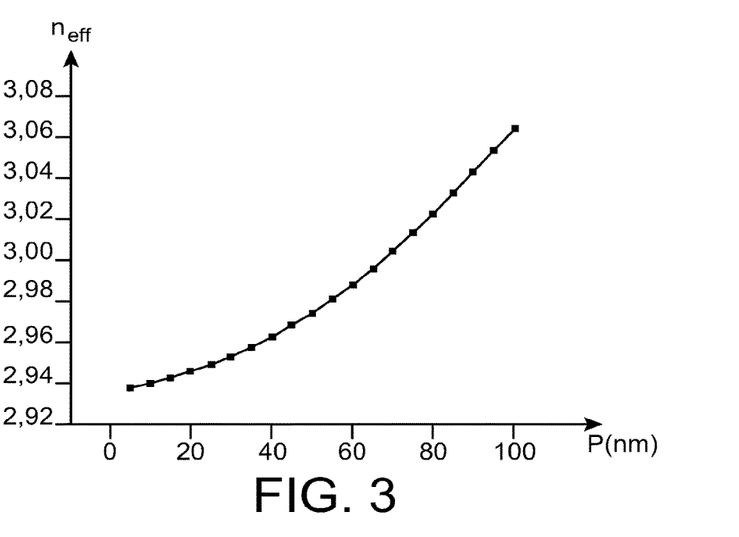
FIG. 3 represents the effective index variation in the optical mode TE00 as a function of the implantation depth in the light propagation region of a waveguide in accordance with the invention.

In FIG. 3 is represented the variation in the effective index $n_{eff}$ of the optical mode TE00 as a function of the implantation depth P in a zone of the light propagation region of the waveguide as a rib in accordance with the invention. This variation has been simulated with a 5 nm pitch on an implantation depth of germanium ions ranging from 5 to 100 nm and at a light wavelength of 1.31 µm. The implanted dose is of $10^{15}$ ions/cm². By way of examples, an implantation energy of 30 keV results in an implantation depth of 50 nm, whereas an implantation energy of 70 keV results in an implantation depth of 100 nm. The waveguide has a height of 300 nm, an etching depth of 150 nm and a width of 400 nm. It is encapsulated by a $SiO_2$ layer.

It is observed from FIG. 3 that a very large variation in the effective index of 0.1 is achieved with a restricted implantation depth, lower than 100 nm, and a low implanted dose typically between $10^{14}$ and $10^{15}$ ions/cm². Such a variation in the effective index could be reached by means of a temperature rise of several hundred degrees, which means that the implanted zone for making spatio-frequential readjustments is very short in comparison with the size of an equivalent heating element. By way of example, the length of the implanted zone required for generating a π phase shift on the arm of the Mach-Zehnder interferometer is set to 6.55 µm for the wavelength of 1.31 µm.

Propagation losses related to defects created by this implantation type turn out to be relatively low, such that for such implantation lengths, they can be substantially neglected.

However, it is possible to further reduce the impact of these readjustments on the propagation losses by micro-nano-structuring the ion implantations. Indeed, in addition to the losses associated with the defects created in silicon, modal losses associated with the localised variations in the index should be taken into account.

For this, the at least one implanted zone can have, in the light propagation direction, an inlet transition section the size of which gradually increases, a centre section having a constant size, and an outlet transition section the size of which gradually decreases.

In a favoured embodiment, the different sections can be made with the same implantation conditions (dose/energy) such that the same concentration profile of species implanted into to the depth of the implanted zone is found throughout the length of the implanted zone. The sections can then be formed during a same implantation, the geometry difference being only due to the shape of a mask upon implanting bounding each of the sections. Alternatively, it is possible to perform multiple implantations by varying the implantation conditions, so as to vary the implantation depth and/or the concentration profile of implanted species within the implanted zone.

Figure 5:
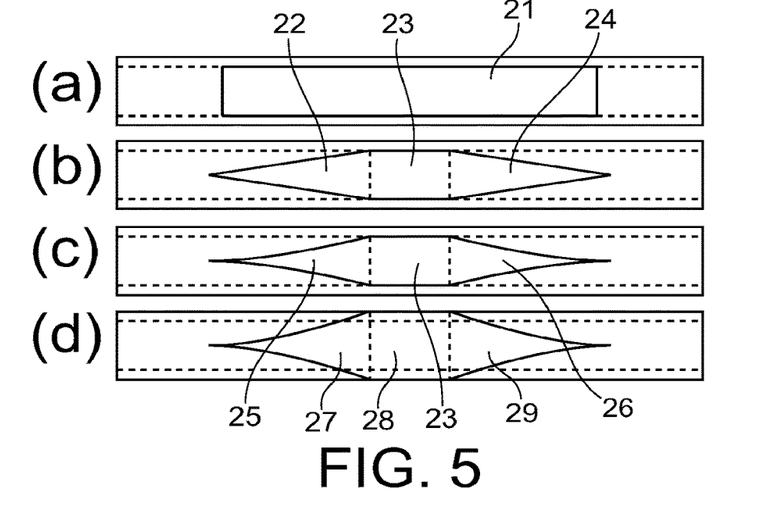
FIGS. 5(a)-5(d) represent different implantation geometries that can be implemented within the scope of the invention.

In this regard, FIG. 5 represents different implantation geometries that can be obtained by implementing the above-mentioned favoured embodiment.

On the scheme referenced (a), the implanted zone 21 does not have transition sections: it has a single geometry along its length by extending on the entire width of the rib or strip in the case of a rib- or strip-type guide, or on a predetermined distance transverse to the light propagation direction in the case of a slab-type guide.

On the other hand, on the schemes referenced (b), (c) and (d), the implanted zone has transition sections which can be developed from analytical or numerical models.

On the schemes referenced (b) and (c), the inlet transition section 22, 25 and the outlet transition section 24, 26 have a width, transverse to the light propagation direction, which linearly varies, respectively in a so-called adiabatic manner in that the index variation does not generate losses, in the light propagation direction. The centre section 23 extends on the entire width of the rib or strip in the case of a rib or strip type guide, or on a predetermined distance transverse to the light propagation direction in the case of a slab type guide.

With a linear transition of 2 µm in inlet/outlet, a transmission of 99.2% of the fundamental mode is observed through the implanted region, versus 92% in the case without transition of the scheme referenced (a).

In the scheme referenced (d), the inlet and outlet transition sections 27, 29 have a width which gradually varies in the propagation direction to, respectively from, the centre section 28 which, when the guide is of the rib type extends over a distance higher than the rib width.

Figure 6:
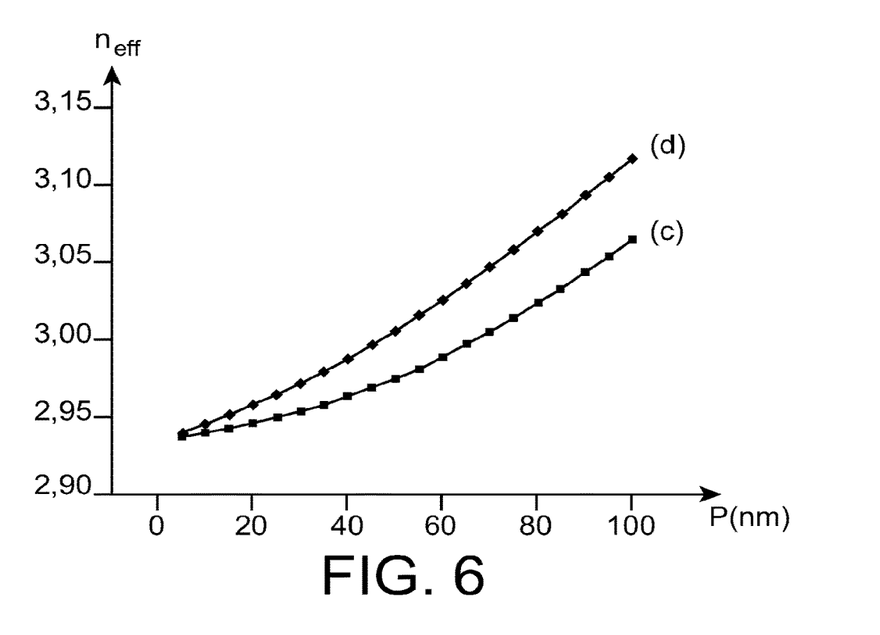
FIG. 6 represents the effective index variation in the optical mode TE00 as a function of the implantation depth for two implantation geometries.

In FIG. 6 is represented the variation in the effective index of the optical mode TE00 as a function of the implantation depth for two implantation geometries, namely those corresponding to the schemes referenced (c) and (d) in FIG. 5. This figure illustrates the impact of the width of the implantation zone on the variation in the effective index. It is observed that an implantation according to the scheme referenced (d) in FIG. 5 enables the implantation depth at a constant effective index variation to be decreased (variation of 0.1 for an implantation 65 nm versus 85 nm in the case of an implantation according to the scheme referenced (c) in FIG. 5).

Figure 7:
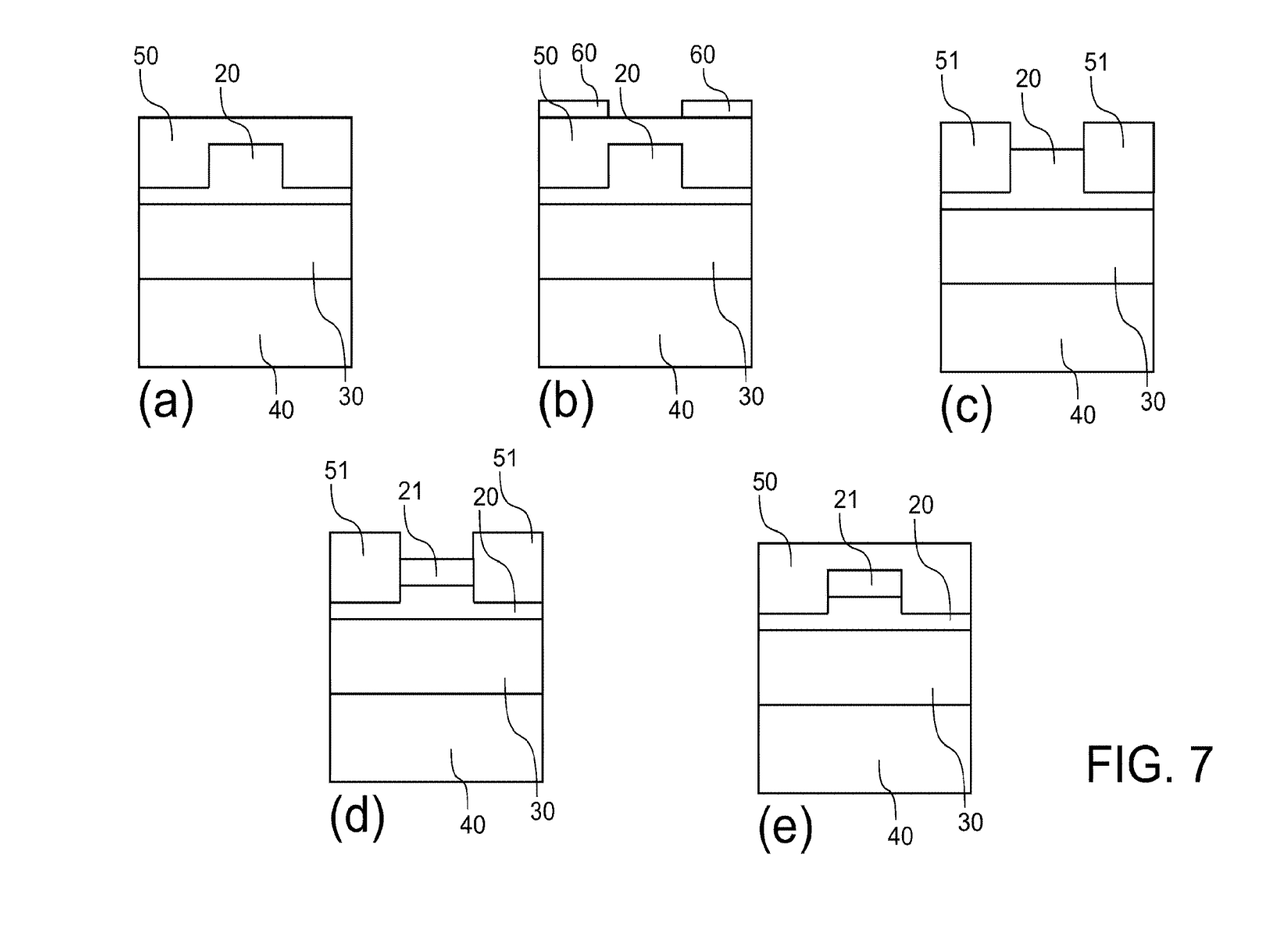
FIGS. 7(a)-7(e) illustrate different steps, made post-manufacture, of forming a waveguide.

In FIG. 7 are represented different steps, made post-manufacture, of forming a waveguide enabling properties of the photonic circuit integrating this waveguide to be readjusted.

At the end of its manufacture, and in reference to the scheme (a) of FIG. 7, the photonic circuit is encapsulated by an encapsulation layer 50 which is conventionally made of $SiO_2$. However, the invention is not limited to this material, but extends to the case of an encapsulation layer of a material having a negative thermo-optic coefficient which has the advantage to counteract the thermo-optic sensitivity of silicon and thus to make guides insensitive to temperature changes. Such a layer is for example made of titanium dioxide (TiO2).

The formation of the waveguide according to the invention is made by removing the encapsulation layer at the zone of the light propagation region the refractive index of which is desired to be modified, implanting said zone, and encapsulating the implanted zone. The removal of the encapsulation layer is typically made by lithography and etching.

When the encapsulation layer 50 is of $SiO_2$, it can play the role of a hard mask. In reference to scheme (b) of FIG. 5, a resin layer 60 is deposited onto the encapsulation layer 50 and then subjected to lithography to define the pattern of the zone of the propagation region the refractive index of which is desired to be modified. In reference to scheme (c), the exposed region of the hard mask 50 is subjected to etching so as to expose the zone to be implanted. The resin layer is then removed. Then, in reference to scheme (d), the ion implantation is thus made to form the zone 21 having a modified refractive index. And in reference to scheme (e), the zone 21 with a modified refractive index is encapsulated again by a $SiO_2$ layer.

When the initial encapsulation layer is of $TiO_2$, it will be noted that a step of depositing a layer of hard mask, typically made of $SiO_2$, onto the encapsulation layer is required before performing the deposition of the resin layer. And the step of encapsulating the zone 21 with a modified refractive index can consist in encapsulating it by $TiO_2$ or any other encapsulation material such as for example $SiO_2$.

Thus, in a possible embodiment not part of the invention, the guide comprises an encapsulation layer covering the entire light propagation region, that is the material encapsulating the zone with a modified refractive index is identical to the material making up the initial encapsulation of the waveguide.

According to the invention, the waveguide comprises an encapsulation layer covering the light propagation region except of the at least one zone, an encapsulation of the at least one zone being made of a material different from the material of the encapsulation layer. An illustrative example is that of an encapsulation layer of $TiO_2$, and an encapsulation of the zone with a modified refractive index of $SiO_2$.

The invention can in particular be implemented when one or more locations of interest for performing readjustment of the circuit properties are predefined and incorporated to the circuit when being manufactured. In reference to FIGS. 1 and 4, the circuit can thereby comprise one or more locations of interest Z1, Z2 where the encapsulation is made of a material different from the encapsulation of the rest of the circuit. A location of interest can be associated with a single guide as is the case for the Mach-Zehnder interferometer represented in FIG. 1. It can also be associated with a plurality of waveguides as is the case for the arrayed waveguide grating (AWG) represented in FIG. 4.

Figure 4:
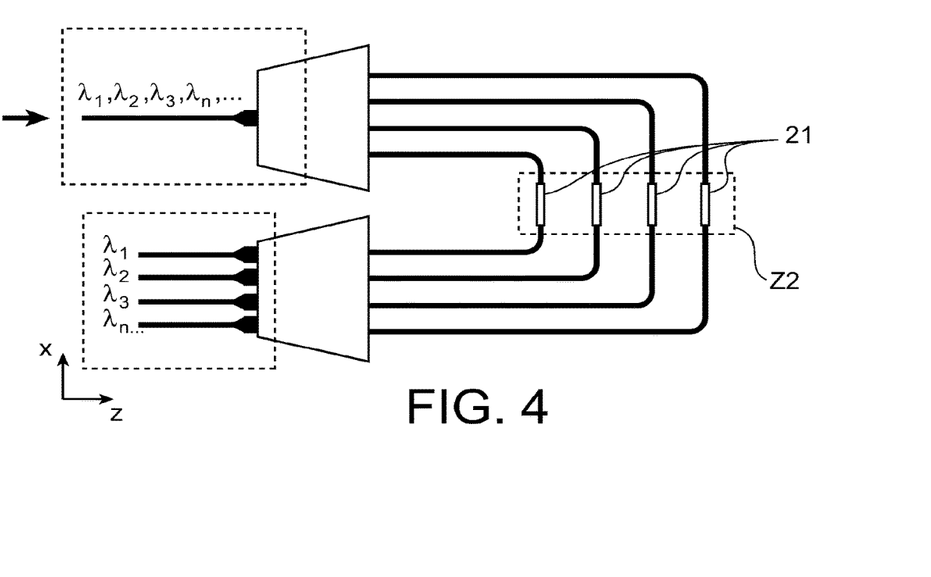
FIG. 4 is a scheme of a planar selective network comprising a plurality of waveguides according to the invention.

A location of interest includes one or more zones to be implanted and has a dimension higher than or equal to that of the zone(s) to be implanted. This dimension can correspond in particular to that of a heating electrode.

These locations Z1, Z2 can thus be encapsulated with $SiO_2$, where the rest of the circuit is protected against temperature changes by an encapsulation layer of $TiO_2$. After an optional implantation of a zone within one of these zones Z1, Z2, the implanted region is re-encapsulated with $SiO_2$ so as not to differ, except for the modification of the refractive index of the implanted region, from the circuit the spectral characteristics of which have been measured. In such a case, the locations of interest used for spatio-frequential readjustments are significantly smaller than the total circuit size in order to ensure its temperature insensitivity (indeed, the locations of interest encapsulated with $SiO_2$ are not protected against temperature changes).

Figure 8:
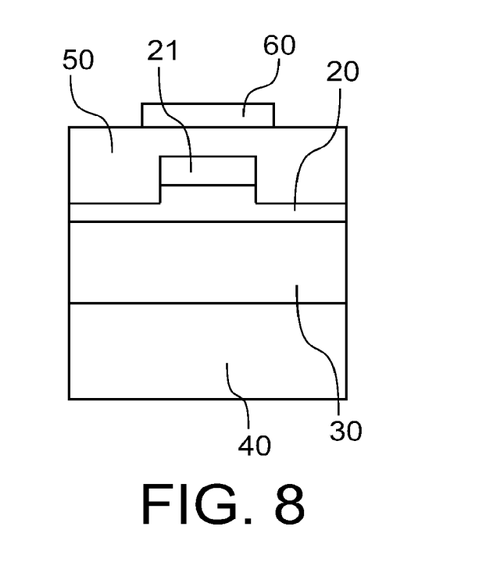
FIG. 8 represents a waveguide in accordance with a possible embodiment of the invention according to which it is provided with a heater forming metal electrode.

As represented in FIG. 8, it is possible on the other hand to arrange a metal electrode 60 on the encapsulation 50 of $SiO_2$ of the implanted zone 21 which thus remains sensitive to temperature changes. In such a case, a first readjustment with a strong amplitude can be performed by implantation, followed by a second extremely fine readjustment by controlling the heating electrode. Because of the first passive readjustment by implantation, the second active readjustment of phase errors by Joule effect has reduced energy consumption in comparison with a situation where it would be used alone.

This hybridisation type of the readjustment techniques is advantageous in the case where WDM (Wavelength Division Multiplexing) signals are very dense (DWDM) where the channels are very close to each other and thus very sensitive to manufacture uncertainties. Thus, the manufacturing errors are corrected coarsely by post-manufacture implantation and finely by joule effect upon using the circuit.

The invention thus enables the energy consumption previously necessary for performing spatio-frequential readjustments to be reduced or even cancelled. Actually, it provides in one embodiment an athermal photonic circuit not requiring active controls to overcome manufacturing uncertainties and temperature variations, or requiring at the very least only minimal controls.

The approach of the invention is further versatile in that post-manufacture readjustments by implantation remain compatible with the active control methods used today.

The invention can on the other hand be implemented post-manufacture with CMOS compatible technologies.

Finally, the stability of this post-manufacture readjustment method is ensured for temperatures lower than the silicon recrystallization temperature, which is the case since the implantation is made after manufacturing. Beyond 550° C., the germanium type implantation effect is cancelled. This effect can be exploited to decrease or even cancel the effect of the implantation, by a local heating, for example if this has been overestimated.

The invention claimed is:

1. A method for adjusting properties of a photonic circuit to fit with expected properties, the photonic circuit including a waveguide comprising a light propagation region initially being covered by an encapsulation layer having a first portion made of a first material and a second portion made of a second material different from the first material, the method comprising:
    a step of removing the first portion of the encapsulation layer and exposing at least one zone of the light propagation region;
    a step of modifying a refractive index of the at least one zone by an ion implantation in the at least one zone; and
    after the step of modifying the refractive index of the at least one zone, a step of covering the exposed at least one zone by forming again the first portion of the encapsulation layer with said first material.

2. The method according to claim 1, further comprising, before the step of modifying the refractive index of the at least one zone, a step of detecting spectral properties of the photonic circuit and a step of determining implantation conditions as a function of deviation of the detected spectral properties relative to the expected properties.

3. The method according to claim 1, further comprising, following the forming again of the first portion of the encapsulation layer, a step of depositing a metal electrode on the formed again first portion that covers the exposed at least one zone.

4. A waveguide for a photonic circuit, comprising:
    a light propagation region in which light remains confined, comprising at least one zone having a refractive index modified by ion implantation and at least one other zone having a different refractive index not modified by the ion implantation; and
    an encapsulation layer, comprising a first portion covering only said at least one zone of the light propagation region having the modified refractive index, and a second portion covering only said at least one other zone of the light propagation region having the different refractive index,
    wherein the second portion is not disposed between said at least one zone and the first portion, and
    a material of the first portion being different from a material of the second portion.

5. The waveguide according to claim 4, wherein the at least one zone includes implanted group IV ion species.

6. The waveguide according to claim 4, wherein the at least one zone extends in a light propagation direction over a length that is greater than half that of a wavelength of the light.

7. The waveguide according to claim 4,
wherein the light propagation region is of a rib or a strip type, and
wherein the at least one zone is an upper portion of the rib or of the strip and extends over a predetermined distance in a light propagation direction.

8. The waveguide according to claim 4, wherein the at least one zone has, in a light propagation direction, an inlet transition section, a size of which gradually increases, a centre section, with a constant size, and an outlet transition section, a size of which gradually decreases.

9. The waveguide according to claim 4, wherein the material of the second portion has a negative thermo-optic coefficient.

10. The waveguide according to claim 4, wherein the the material of the second portion is $TiO_2$, and the material of the first portion is $SiO_2$.

11. The waveguide according to claim 9, further comprising a metal electrode disposed on the first portion of the encapsulation layer.

12. A photonic circuit comprising a waveguide according to claim 4.

13. The waveguide according to claim 5, wherein the group IV ion species are germanium ions.

* * * * *